United States Patent [19]
Berkovich et al.

[11] Patent Number: 5,619,680
[45] Date of Patent: Apr. 8, 1997

[54] METHODS AND APPARATUS FOR CONCURRENT EXECUTION OF SERIAL COMPUTING INSTRUCTIONS USING COMBINATORIAL ARCHITECTURE FOR PROGRAM PARTITIONING

[76] Inventors: Semyon Berkovich; Efraim Berkovich, both of 11918 Stonewood La., Rockville, Md. 20852

[21] Appl. No.: 348,097

[22] Filed: Nov. 25, 1994

[51] Int. Cl.$^6$ ..................................................... G06F 13/00
[52] U.S. Cl. .......................................................... 395/497.04
[58] Field of Search ................................ 395/497.04, 375

[56] References Cited

U.S. PATENT DOCUMENTS

| | | | |
|---|---|---|---|
| 5,021,947 | 6/1991 | Campbell et al. | 395/700 |
| 5,197,137 | 3/1993 | Kumar et al. | 395/375 |
| 5,347,639 | 9/1994 | Rechtschaffen et al. | 395/375 |

OTHER PUBLICATIONS

W. Smith et al., "Bipartite Memory Network Architecture for Parallel Processing", Dept. of Computer Science, Urbana, Ill., (Jun. 1990) pp. 1–16.

N. Karmarkar, "A New Parallel Architecture for Scientific Computation Based on Finite Projective Geometries", *Mathematical Programming: State of the Art 1994*, (1994), pp. 136–138.

N. Karmarkar, "A New Parallel Architecture for Sparse Matrix Computation Based on Finite Projective Geometries" *ACM*, (Jul., 1991) pp.358–369.

I.S. Dhillon et al.,"An Overview of the Compilation Process For A New Parallel Architecture", Supercomputing Symposium '91, Fredericton, NB Canada, Jun. 3–5, 1991, pp. 471–486.

T.V. Lakshman et al., "Efficient Decentralized Consensus Protocols", *IEE Transactions on Software Engineering*, vol. SE–12, No. 5, (May 1986), pp. 600–607.

D. Douglas Wilmarth, "The Compute Cluster and Other Parallel Programming Models", *Computer*, (Aug. 1993), pp. 70–72.

Leslie Lamport, "How to Make a Multiprocessor Computer That Correctly Executes Multiprocess Programs", *IEEE Transactions on Computer*, vol. C–28, No. 9, (Sep. 1979), pp. 690–691.

M. Dennis Michunas, "Using Projective Geometry to Design Bus Connection Networks", Department of Computer Science, Univ. of Illinois at Urbana–Champaign, pp. 47–55.

Sarita V. Adve et al., "A Unified Formalization of Four Shared–Memory Models", *IEEE Transactions on Parallel and Distributed Systems*, vol. 4, No. 6, (Jun. 1993), pp. 613–624.

Charles J. Colbourn et al., "Applications of Combinatorial Designs in Computer Science", *ACM Computing Surveys*, vol. 21, No. 2, (Jun. 1989), pp. 223–250.

Rohit Chandra et al., "Cool: An Object–Based Language for Parallel Programming", *Computer*, (Aug. 1994), pp. 13–26.

*Primary Examiner*—William M. Treat
*Assistant Examiner*—Kevin L. Ellis
*Attorney, Agent, or Firm*—Lowe, Price, LeBlanc & Becker

[57] ABSTRACT

A computing system having a plurality of processing elements for concurrent execution of a serial program is able to run applications developed for single processors without change to source code or object code by allocating instructions to various processors depending upon the addresses contained within their operand(s). The memory space of the system is partitioned into individual memory blocks which are controlled by dedicated memory coordination units and plural memory coordination units are associated with each processor in a combinatorial connection arrangement. This allows instructions to execute on processors which inherently have all the information needed in their registers at the time of execution thus enhancing performance. The plurality of memory coordination units connected to a processing element are associated with FIFO queues which are utilized to ensure sequential consistency including the cases of indirect addressing and conditional jumps.

12 Claims, 7 Drawing Sheets

METHODS AND APPARATUS FOR CONCURRENT EXECUTION OF SERIAL COMPUTING INSTRUCTIONS USING COMBINATORIAL ARCHITECTURE FOR PROGRAM PARTITIONING

TECHNICAL FIELD

The invention relates to the field of computer systems, and more particularly to the field of microprocessor organization utilizing concurrent processing.

BACKGROUND ART

A variety of computer systems are known in the prior art which utilize parallel processing. These systems traditionally require that software be specially designed and written to attempt to take advantage of parallel processing capability. To move software from a single processor environment to a parallel processing environment requires a redesign of the software. Such redesign is labor intensive and serves as a deterrent for owners of applications to migrate their software for use on parallel processing systems.

FIG. 1 represents the relationships among different versions of the same program as it is prepared to run on a single processor computer.

Source code represents a set of computer instructions written in a language which is moderately intelligible to humans. Through the process of compilation, 105, source code is converted into object code 110 which contains machine language instructions for carrying out the statements expressed in source code. Frequently, when using a development system to write, test and debug source code, certain predefined subroutines or functions are invoked which are available in the libraries of the development system. A software developer may also wish to incorporate certain modules previously created and tested by the developer into the program under development. These incorporations can be created by including external "calls" to the subroutines, special functions or library routines in the text of the source code. Such external references are not included in object code but are incorporated into the instructions to be run on a particular computer by the process of linking (115). The linked object code 120 includes all of the code required to execute all of source code and the external subroutines and library functions.

Once the source code has been compiled and linked, it is ready for loading on the target machine where it will be executed. In the process of loading, the instructions are sequentially stored in an instruction memory and variable names which are represented by English like words in the source code are converted to addresses in the memory space of the target machine where the values are to be stored. Commonly, a list of such addresses and variable names are available through the development environment for purposes of testing and debugging.

In the prior art, as indicated above, when attempting to increase the processing power of a computer by providing several parallel processors which operate simultaneously to execute the machine language instructions, a complete redesign of the source code is necessary to take advantage of parallel processing operations. In some environments, source code is changed to include special symbols which indicate which operations are capable of being executed in parallel. In others, certain directives are necessary to allocate instructions to specific ones of the parallel processors.

In the prior art, the problem of synchronizing execution of different branches of the program including fetching instructions and allocating them to the proper microprocessor of a parallel processing system represented a serious design problem. System designers also faced the problem of what to do with conditional jumps when different paths were taken depending on the outcome of a calculation. If one path were assumed and the instructions for that path executed, and the conditional jump decision required taking the other path when it was executed, the calculations previously made would have to be invalidated and processing backup to the point where the correct path could be taken. This undermines the efficiency of parallel processing and is undesirable.

DISCLOSURE OF THE INVENTION

According, one advantage achieved by the invention is to utilize the regular source code and object code created for single processor computers and to run them on a plurality of processors with no change.

Another advantage of the invention is to load object code developed for a single processor onto plural processors in a way which requires only minor differences from the loading employed for a single processor computer.

Another advantage of the invention is the allocation of instructions to plural processors automatically.

Another advantage of the invention is the overcoming of problems traditionally associated with plural or parallel processor computing systems such as the problems with fetching instructions and allocating them to the microprocessor and the problems associated with conditional jumps.

Another advantage of the invention is much improved performance of a plural processor computing system which is achieved by fetching memory information to cache memory in anticipation of actual requirements, by partitioning the input/output into parallel paths and by addressing simultaneously all bottlenecks characteristic of prior art parallel processing systems.

These and other objects and advantages are achieved by providing a computer system having a memory, partitioned into memory blocks with a corresponding plurality of memory control units or memory coordination units (MCU). Each MCU controls access to a respective block of memory. A plurality of processing elements (each including, for example, RISC or CISC processors) are each connected to two or more memory control units using a combinatorial design. The interface between the MCUs and the processing elements includes one or more queues for receiving information from respective ones of the memory control units connected to the processor. Each processor includes an instruction memory, a private memory and a unit for processing global control information and signals.

Instructions of a program are provided to the single processor of the parallel array which serves the MCUs which control the memory blocks having an address space which encompasses the addresses of the operands specified within instructions.

Each memory control unit includes a scratch pad register and a unit controller. The scratch pad register mirrors the registers of the processors served by the memory control unit. The scratch pad register includes a scratch pad register set for each processor which accesses the memory block served by the memory control unit. The memory control unit also includes cache memory. A plurality of secondary storage areas, one corresponding to each memory block, are controlled by the same memory control unit as the corresponding memory block.

The instruction format includes an operation code, optional first and second addresses and a special queue control directives which can be included in a queue control field.

The invention is also directed to a method of allocating instructions of a program to a plurality of processors in which the memory space of the parallel processing system is partitioned into memory blocks, with each memory block being controlled by a respective memory control unit. Each processor is assigned to serve two or more memory control units. Instructions of a program are allocated to a processor which serves the memory blocks containing the addresses of the operands specified within the instruction.

The invention is also directed to a method of allocating instructions of a program to a plurality of processors. The program is compiled into object code and linked with external routines. The linked code is loaded into partitioned memory of a computer so that variables are spread substantially equally across all partitions of memory based on numbers of variables and upon variable usage. Instructions are then allocated to a processor based on the processor's ability to access the memory blocks which contain the addresses required by operands of the instruction being allocated.

The invention is also directed to a method of ensuring sequential consistency in computer system having a plurality of processing elements and a plurality of memory control units in which information from each memory control unit is queued in a queue. Irrelevant queue entries are eliminated by including a queue control directive independent or as part of an instruction.

The invention is also directed to a method of accessing information in computer system having a plurality of processing elements in which a memory space is partitioned into memory sections and access to each memory section is separately controlled with a memory control unit. Each of a plurality of processing elements is connected to a plurality of memory control units and an instructions is allocated only to a processing element serviced by memory control units which have access to all data elements required by said instruction.

Still other objects and advantages of the present invention will become readily apparent to those skilled in the art from the following detailed description, wherein only the preferred embodiment of the invention is shown and described, simply by way of illustrations of the best mode contemplated of carrying out the invention. As will be realized, the invention is capable of other and different embodiments, and that several details are capable of modifications in various obvious respects, all without departing from the invention. Accordingly, the drawings and description are to be regarded as illustrative in nature, and not as restrictive.

BEST MODE FOR CARRYING OUT THE INVENTION

Figure 1:
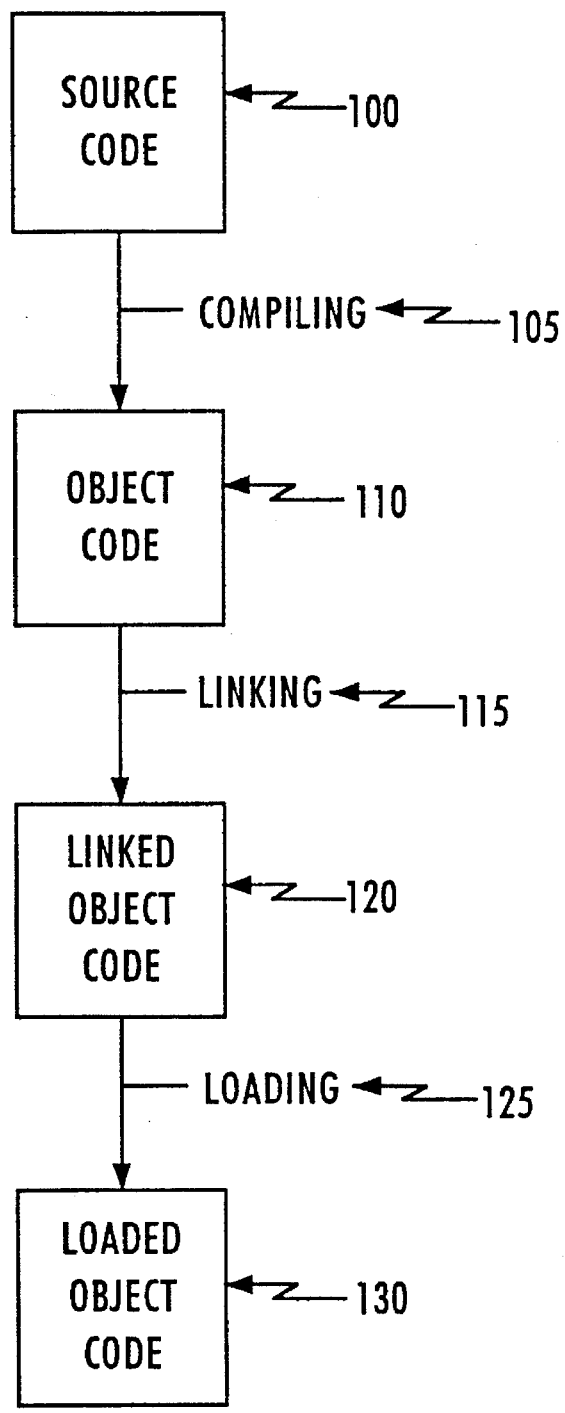
FIG. 1 is an illustration of the relationship among source code, object code, linked object code and loaded object code as different versions of the same program are prepared to run on a computer.
Figure 2:
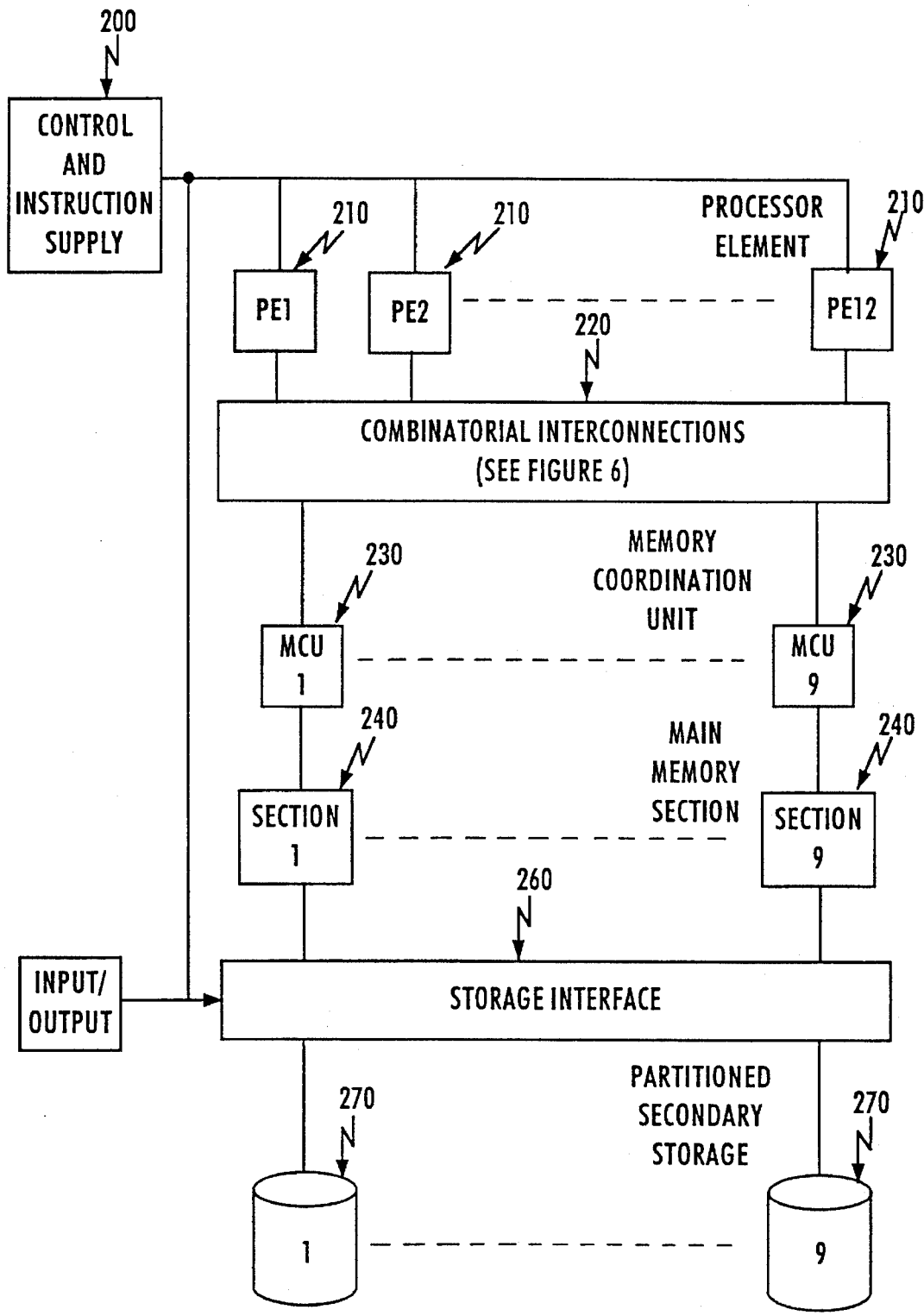
FIG. 2 is a depiction of the architecture of a multiprocessor system according to the invention.

FIG. 2 describes the architecture of a compound multiprocessor system according to the invention. A number of processing elements 210 provide the computing power for the architecture. Each processing element is described more in detail in connection with FIG. 7.

A number of memory coordination units 230 are connected to the processing elements 210 by way of combinatorial interconnections 220 which are discussed more in conjunction with FIG. 6 hereinafter.

Main memory for the system is partitioned into mutually exclusive memory sections 240 and each section is dedicated to a memory coordination unit (MCU) 230. Storage interface 260 permits input/out to main memory as well as direct access to secondary storage. Secondary storage may consist of separate units each dedicated to a memory coordination unit 230 or may consist of partitions of disk drives to provide dedicated areas of secondary storage. As described more hereinafter, the MCUs comprise cache memory as well as certain registers. There is thus a hierarchy of storage which ranges from the very slow secondary storage to the intermediate main memory to the fast cache storage into the very fast register storage.

Control and instruction supply 200 serves as an interface for loading instructions into each of the processing elements and manages certain global control functions during operation.

Figure 3:
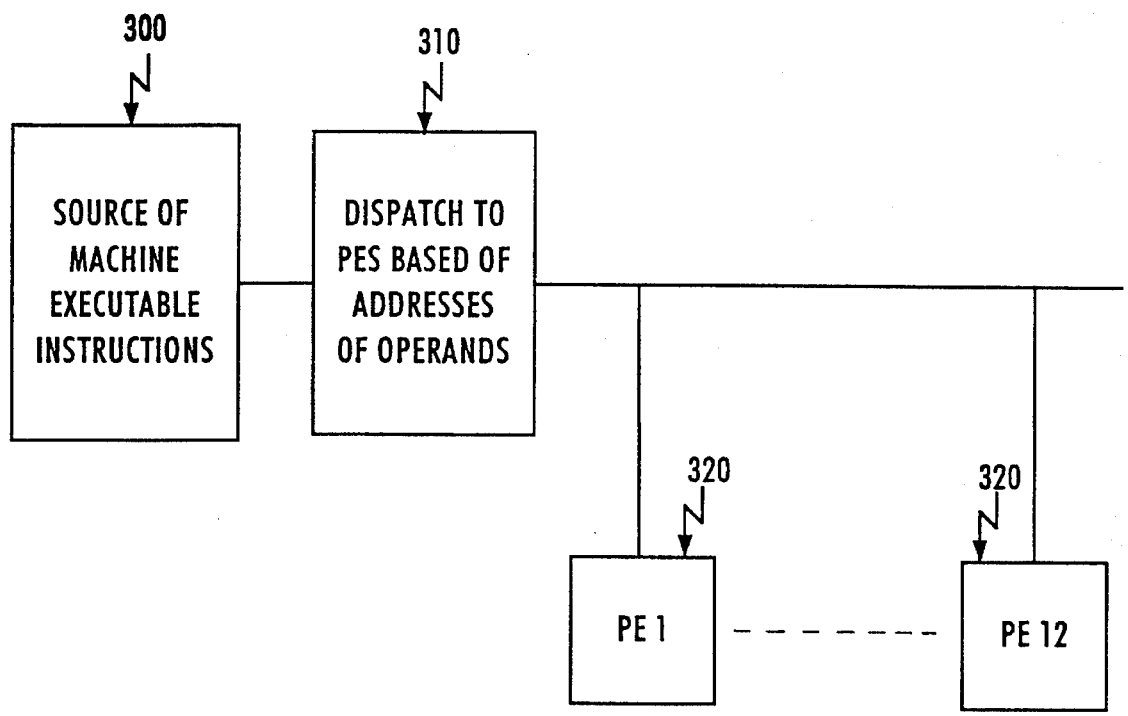
FIG. 3 as an illustration of the function of distribution of instructions to processing elements of the multiprocessing system.
Figure 4:
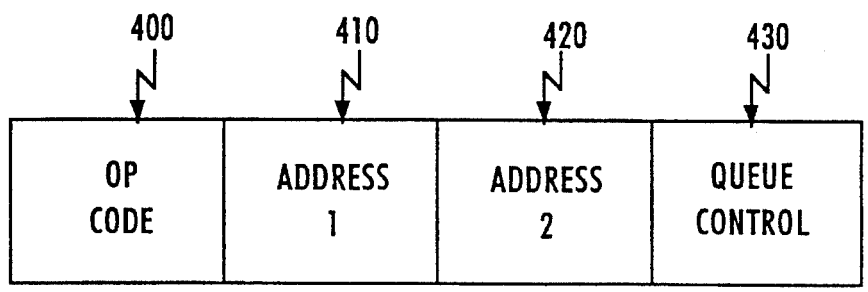
FIG. 4 is an illustration of the format used for instructions in multiprocessor system of the invention.

FIG. 3 illustrates the functions associated with the distribution of instructions to processing elements of the system of the invention. A source of machine executable instruction 300 is dispatched to processing elements 320 based on the addresses of operands contained within the instructions. This will become clear from considering the format of typical instruction shown in FIG. 4. Each instruction contains an operation code or OP code 400 which specifies what the processor is to do. Each OP code is one of a set of primitives built into the processor for use in program execution. Frequently, the OP code requires one or more addresses 410, 420 to be specified. According to the invention, a queue control field 430 is added to the instruction to facilitate certain queuing operations described hereinafter.

In block 310 of FIG. 3, the particular processing element to which an instruction is dispatched for execution is determined based on the addresses 410 and 420 described above.

How this works will be described briefly with reference to FIG. 2. Each processing element 210 is associated, in the example shown, with three memory coordination units 230. Each memory coordination unit is associated with a single section of memory 240. In order to determine to which processing element the instruction is to be dispatched when there are two addresses, one identifies the sections of memory (and therefore the MCUs) in which the addresses specified in the operands are located.

By virtue of the combinatorial interconnections 220, which can be of a large class of combinatorial designs, which will be discussed in more detail in conjunction with FIG. 6, there is only one processor associated with each different set of two memory sections. The instruction is assigned to the processor which services both memory sections. In the case of indirect addressing, the instruction is replicated to be available at the right time at the appropriate places.

If the instruction has only one address, then, in the example shown, any of three processors which connect to the MCU which services the memory segment in which the single address is found can be utilized to execute the instruction. If no addresses are required by the OP code, then the instruction may be assigned to any of the processing elements 210.

By spreading the addresses used for storing variables across all memory sections somewhat equally, one achieves a measure of load balancing across all processing elements 210. For those instructions which may be executed on more than one processing element by virtue of having only one or no addresses involved, the instructions may be assigned to processing elements to correct any residual load imbalance. Certain variables may be used more than others in the process of executing a program. It may be desirable to optimize the placement of variables based on variable usage, as well, by adjusting the memory section in which the high usage variables are placed.

Figure 5:
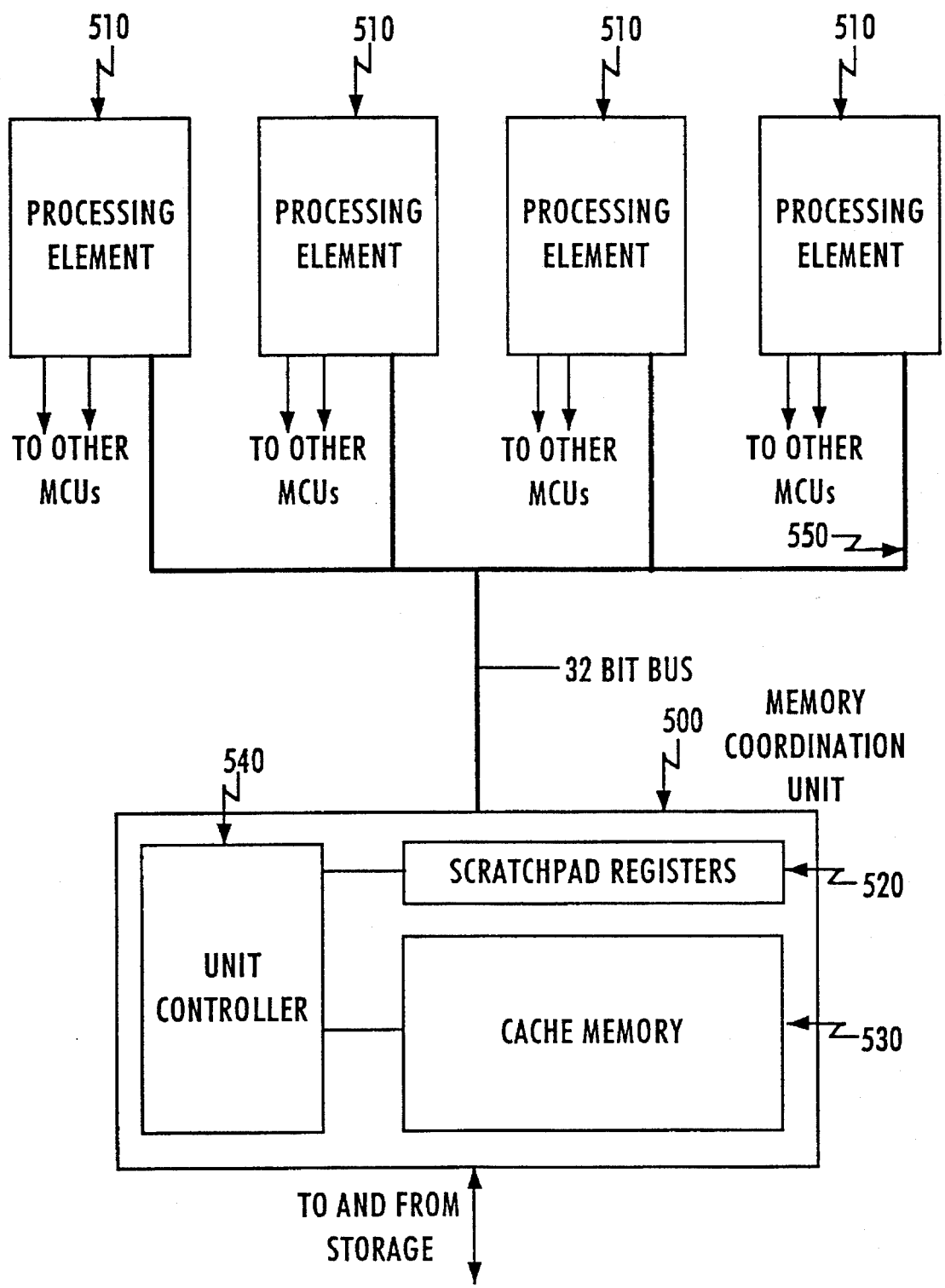
FIG. 5 is an illustration of the details of a memory control or coordination unit of the invention.

FIG. 5 illustrates the details of a memory control unit of the invention. In the example shown, each processing element 510 connects to three MCUs. Each MCU connects to four processing elements 510. Unit controller 540 manages accesses to and from storage. The unit controller also manages cache memory 530 and scratch pad registers 520. In scratch pad registers 520 there is one scratch pad register set for each processing element connected to the MCU. Each scratch pad register set replicates the set of registers in each processing element. Unit controller 540 manages all memory, secondary storage and I/O access in order to provide the information needed by processing elements 510 to carry out the instruction currently being executed by that processing element. Bus 550 is typically a 32 bit bus for accommodating a 32 bit processor.

Figure 6:
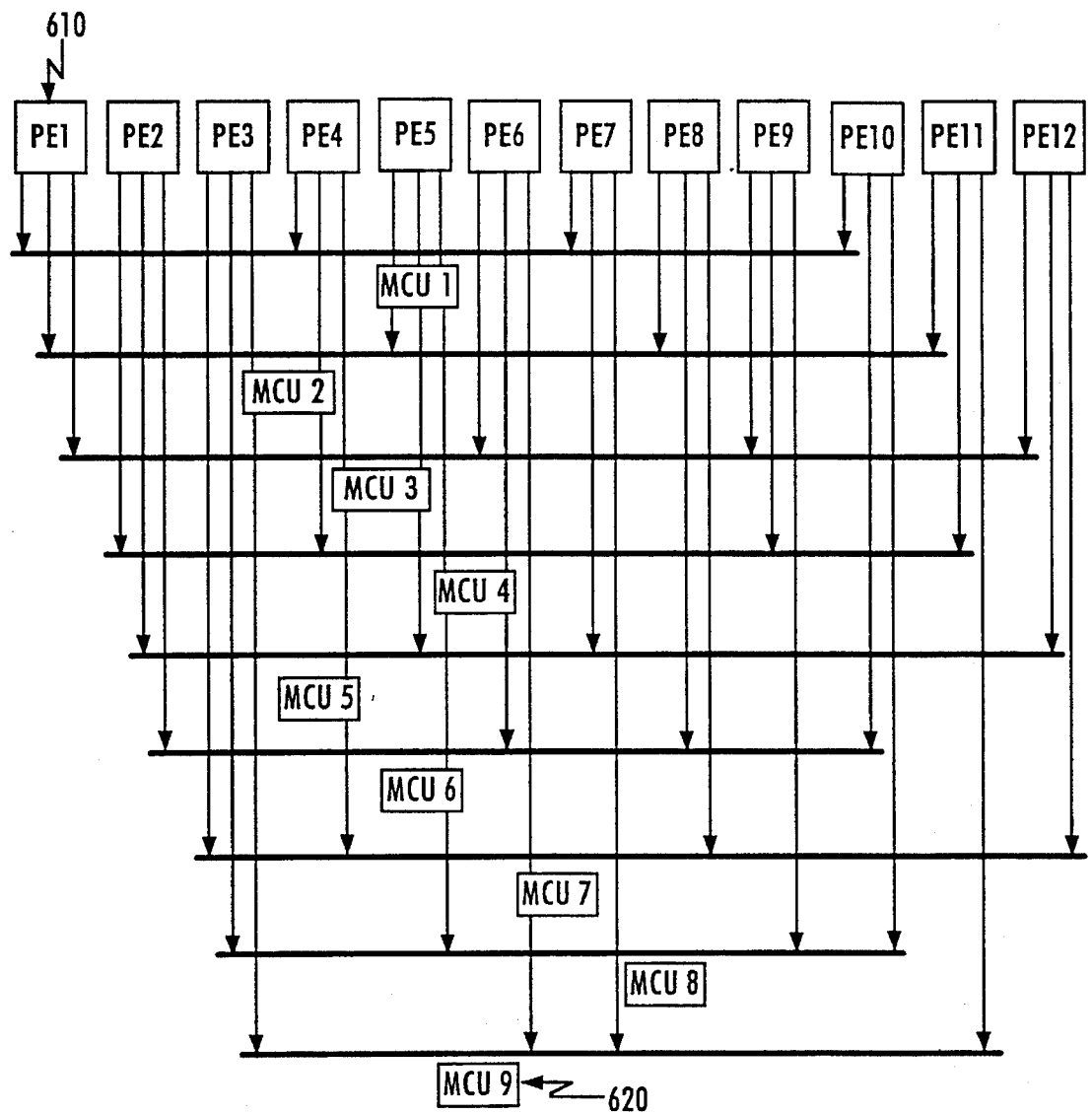
FIG. 6 is a representation of the combinatorial interconnections between the processing elements and the memory control units according to the invention.

FIG. 6 is representation of one implementation of combinatorial interconnections between the processing elements 610 and memory coordination units 620. In FIG. 6 the shaded horizontal bars represent the MCU identified near the bar. Processing elements which connect to a particular MCU, are indicated by arrows which terminate on the thick shaded bars. Thus, for example, MCU 1 is connected to the first line of processing element 1, the first line of processing element 4, the first line of processing element 7 and the first line of processing element 10. MCU 6, on the other hand, connects to the third line of processing element 2, the second line of processing element 6, the second line of processing element 8 and the second line of processing element 10. Thus, each processing element has three connections to respectively different MCUs. Each MCU, on the other hand, connects directly to one input/output line of four different processing units. Recalling that each MCU is dedicated to a particular block of memory, an instruction which would require access to data elements in memory sections 2 and 6 would be assigned to processing element 8 because processing element 8 connects to MCU 2 and to MCU 6. Thus, the data required to execute a two address instruction, such as one in which one address which is in the memory space of MCU 2 and the other address which is in the space of MCU 6, are co-located only in processing element 8. It is therefore efficient to execute the instruction in processing element 8.

The performance of a multiprocessor system depends on the efficiency of its interconnection network. An efficient communication network for a high performance multiprocessor system must provide low latency memory access and message transmission. All interconnection mechanisms in multiprocessor systems, using either message passing or shared memory communications, are actually based on the same operational principle: shipping a data item from a node where it is stored to a node where it is needed for processing. A different approach to the organization of interconnections in multiprocessor computer systems is used in the invention. The bus interconnection network is based on a combinatorial design in which information interaction is performed directly through local interactions of replicated data, while the updates are incorporated in follow-up broadcastings. By interacting with replicated data locally, this organization provides low latency for memory access.

In a this type of network it is convenient to use network based on finite projective planes of a combinatorial design for the specific implementation.

The combinatorial designs can be applied to the construction of bus interconnection networks. In one such network, a set of processing elements is interconnected by a collection of buses corresponding to the subsets in the combinatorial design. This network can provide a direct link between any pair of processing elements. The multiprocessor interconnection network of the invention uses a similar combinatorial arrangement, but in a reverse sense: the elements of the original set represent interconnection links (like buses), while the subsets of these elements represent the processing elements or nodes.

An object (data item stored in memory) stored in the system is associated with a certain link (MCU) and is replicated in each of the nodes (PEs) that this link connects. Because of the combinatorial design property, for any pair of objects (data elements of a two address instruction) there exists a processing element where copies of these objects reside together. An act of interaction of two objects occurs locally between their copies within this processing node. After the interaction, the updates can be sent immediately to all processing elements where needed. Conventional computer systems using replicated data normally have these data in different versions. To maintain coherence, these systems employ a lengthy procedure that keeps track of the time stamps of the copies.

More information concerning the use and application of combinatorial designs is set forth in an Article by inventor Simon Y. Berkovich, entitled "Multiprocessor Interconnection Network Using Pairwise Balanced Combinatorial Designs", published in May, 1994 in Information Processing Letters 50 (1994), pages 217–222. This Article is hereby incorporated by reference in this application.

Figure 7:
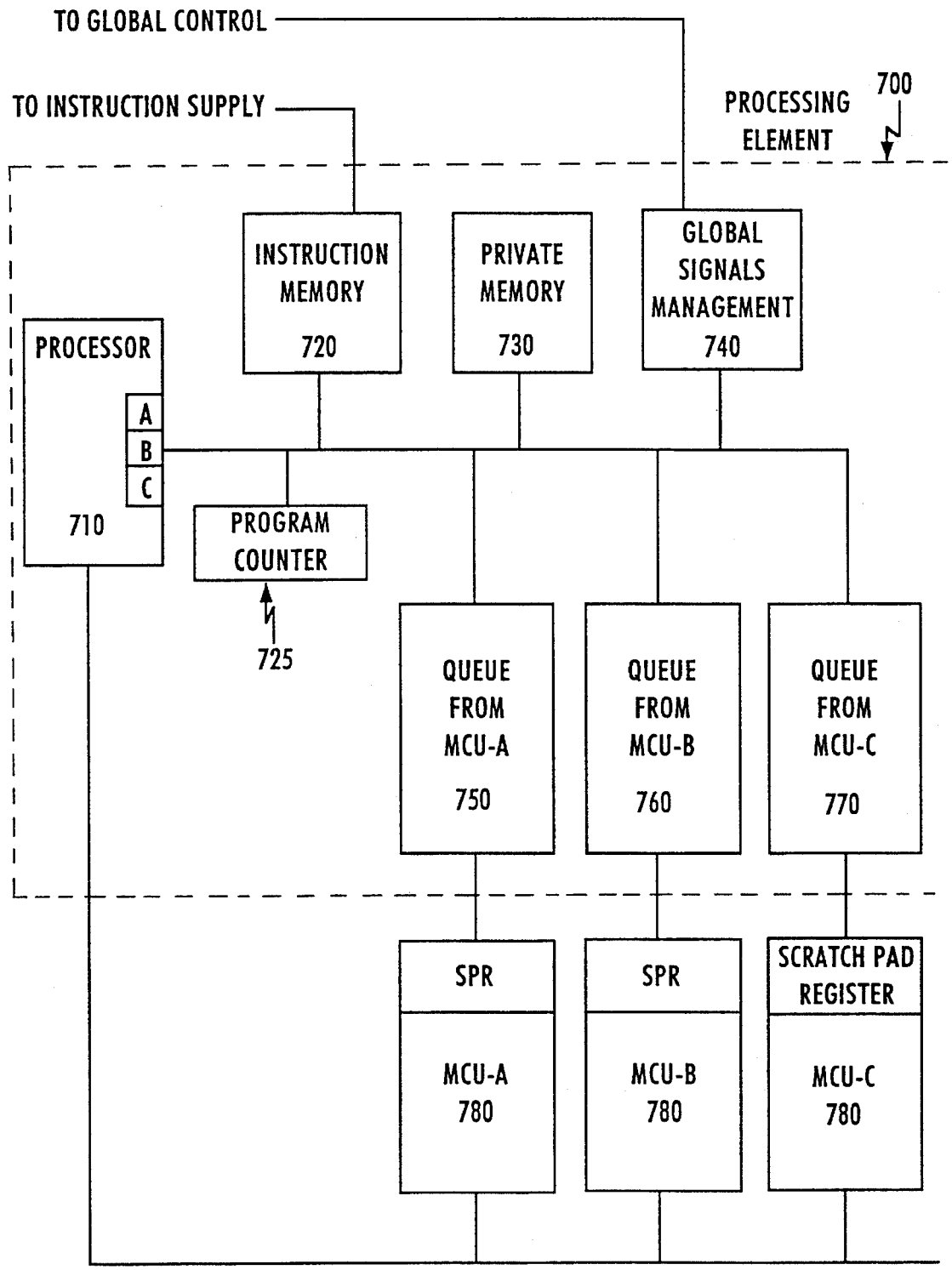
FIG. 7 is an illustration of a processing element used in the invention.

FIG. 7 illustrates a processing element utilized in accordance with the invention. Processing element 700 includes a processor 710, an instruction memory 720, private memory 730, global signals management unit 740 and three queues 750, 760 and 770 which receive information from each of three memory coordination units MCU-A, MCU-B, and MCU-C, each identified as 780.

Instruction memory 720 contains the instructions to be executed by processor 710. These instructions are loaded into the instruction memory during the loading of the linked object code into the machine. Program counter 725 contains the address of the instruction currently being executed by processor 710. A program counter 725 causes the instruction memory 720 to output the instruction to the bus. The contents of the addresses contained within the instruction all have been retrieved by memory coordination unit 780 by executing one or more anticipatory accesses to memory so that data will be available in the scratch pad register for the memory coordination unit delivering the data and applied to respective queues 750, 760 or 770 for inclusion in the registers of processor 710 for execution. The output condition or state from the registers A, B and C is shown symbolically as part of processor 710 in FIG. 7. The number of actual registers and therefore the number of registers actually utilized in the scratch pad registers of each of the memory control coordination units depends upon the particular type of processor utilized. Only three registers are shown here for example. If by execution of the instruction the states of the registers A, B and C are changed, the revisions will be applied to scratch pad registers of the memory coordination units for dissemination either to other processing elements or for placement in storage, or both.

The partitioning of memory is preferably done by dividing memory based on the last digit(s) of the address, i.e. module N, where N is the number of processors. However, for ease of understanding, an example will be given in which memory is partitioned using the first digit of the address. Other schemes for partitioning memory are clearly within the scope of the invention.

The first function is a simple read instruction. This might be represented in source code as: READ MEM_LOC. Assume that variable MEM_LOC is stored in memory at address 532,108. Once the source code is compiled, linked and loaded, the source code statement might translate into an OP code with a single address such as: READ 532,108 (and place a result in register A). Because the instruction has only a single address as an operand, the instruction can be assigned to any processing element which services address 532,108.

In the examples described herein, one will assume that MCUs are assigned to respective groups of 100,000 words of 4 bytes each. Referring to the combinatorial design illustrated in FIG. 6, MCU 5 (to which memory location 532,108 is assigned) is connected to any of processing elements 2, 5, 7 or 12. Thus, the instruction may be executed by any of these processors. The READ OP code and address initiate a transaction by which MCU 5 retrieves and places in a register specified by OP code (in this example, in register A) in the scratch pad register of MCU 5 associated with the processing element selected for execution. The contents of scratch pad register 5 are placed in the queue associated with MCU 5 on the processing element selected for execution and, when the information reaches the top of the queue, is transferred to register A of the processing element assigned.

Consider another source code instruction: WRITE MEM_LOC. MEM_LOC is the same variable used in the preceding paragraph and one may assume that this variable is located at the same address as in the prior example.

The processors utilized for the processing elements are typically RISC or CISC processors for which a complete set of OP codes are defined. Commonly, when a processor initiates storing a variable, the contents to be written are stored in one register and the address of the variable to which the contents are to be written is stored in another register. Then upon execution of an OP code available for that purpose, one would write the contents of register C to the register A address location. Again, this is a single address instruction destined for MCU 5 and so the instruction can be executed by any of processing elements 2, 5, 7 or 12 served by MCU 5.

As another example, consider the source code statement: ANSWER=X1+Y1.

When compiling the source code statement, the compiler would associate the variable names with relative addresses in the memory space. The loader would then associate variables with some absolute value (i.e. an address) in the memory space. For the purposes of this example, let us assume that the variable ANSWER is stored at address 725,132; X1 is stored at 595,104 and Y1 is stored at 422,844.

Under these circumstances, the machine language statements required to execute the source code statement could perform the following:

READ X1 FROM 595,104 AND PLACE IT IN REGISTER A.

READ Y1 FROM 432,844 AND PLACE IT IN REGISTER B.

EXECUTE AN OP CODE TO ADD THE CONTENTS OF REGISTER A WITH THE CONTENTS OF REGISTER B AND PLACE A RESULT IN REGISTER C.

WRITE THE CONTENTS OF REGISTER C TO ADDRESS 725,132.

Figure 8:
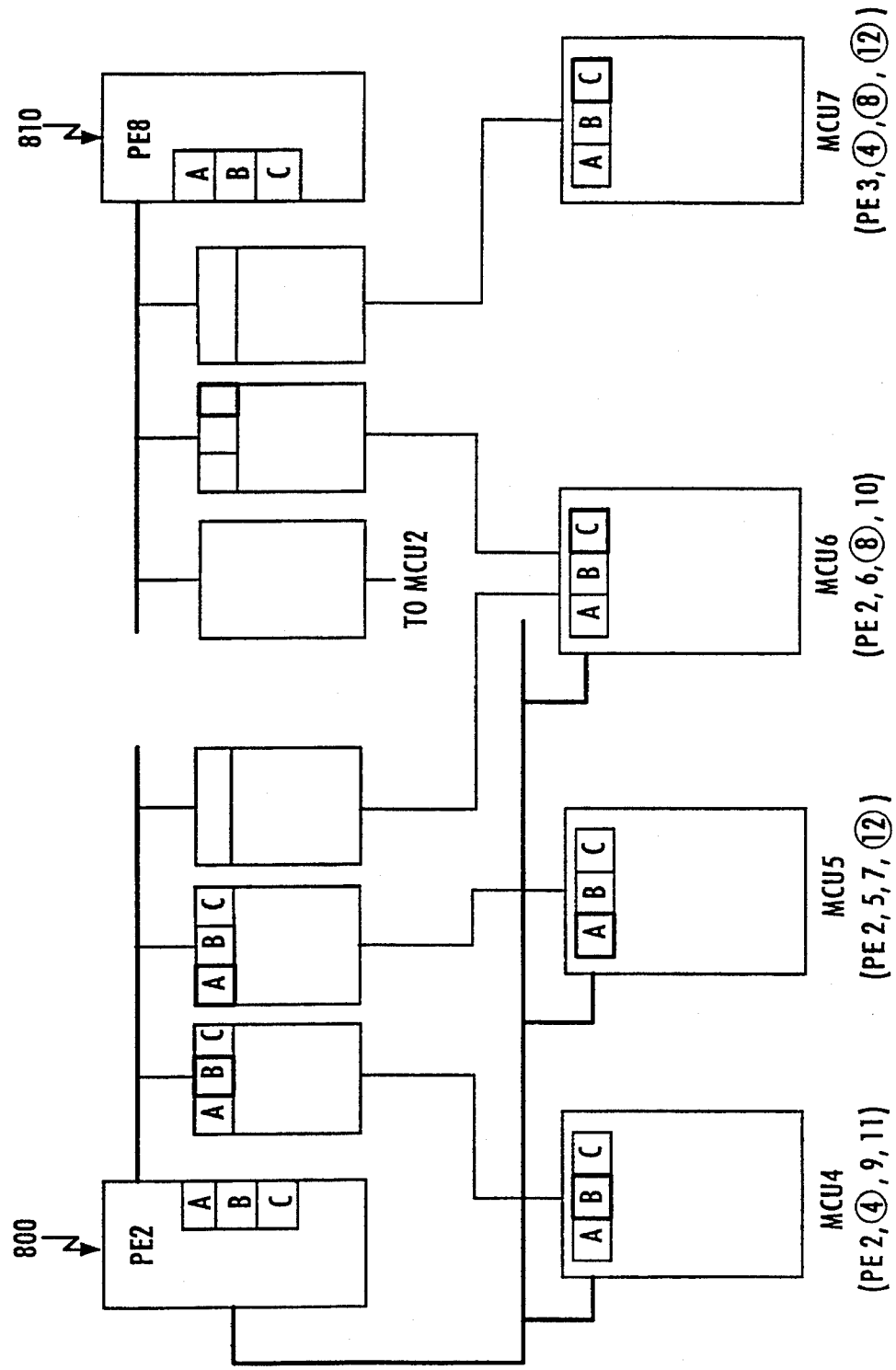
FIG. 8 is an illustration of processing involved with execution of a typical source code instruction.

The execution of the machine language instructions described functionally above will be illustrated with respect to the architecture of the invention in FIG. 8.

FIG. 8 shows processing units 2 and 8 (800 and 810 respectively) each of which is illustrated in an abbreviated drawing to show only the queues and the register elements associated with each of those processing units. Processing element 2, as shown in FIG. 6, is served by MCU 4, MCU 5 and MCU 6. The processing elements connected to each of these respective MCUs are shown in parenthesis beneath the MCU label in FIG. 8. Consistent with earlier assumptions, MCU 4 services memory block extending between addresses 400,000 and 499,999. This MCU will be tasked with responsibility of retrieving the value of variable Y1 which is found at address 432,844. MCU 5 services in this example memory block 500,000 through 599,999. Since variable X1 is stored at 595,104, MCU 5 is tasked with the responsibility of retrieving X1 from address 595,104. In FIG. 8, symbolically, the darkened box around register B of the scratch pad register of MCU 4 indicates that MCU 4 retrieved variable Y1 from its address 432,844 and placed it in register B. Similarly, the darkened box around register A of MCU 5 indicates that MCU 5 retrieved variable X1 from its address 595,104 and placed the contents in register A. The information from both of these retrievals is then placed in respective queues of processing element 2 as indicated by the darkened boxes. When these retrievals reach the top of the queue (in this example, the queues are first in-first out (FIFO), the data is placed in the registers of processor 800 and an OP code executed to add the contents of register A to the contents of register B and place the result in register C. The modified register contents from the processor 800 can then be written back to the scratch pad registers of each of the MCUs 4, 5 and 6. None of these MCUs, however, have access to address 725,132 which is managed by MCU 7. MCU 6, however, is also associated with PE 2 and MCU 6 shares processor PE 8 with MCU 7. Thus, MCU 6 is linked to the queue associated with PE 8 where it would be reflected in register C in the processor once the entry reached the top of the queue. At that time, an OP code would be executed to write the contents of register C in PE 8 to address 725,132 and the write command would be executed with respect to a set of scratch pad registers associated with PE 8 and MCU 7. The memory coordination unit 7 would insure that the contents of register C in the scratch pad register would be written to the appropriate address in the memory block of MCU 7.

Indirect addressing requires some special treatment.

Assume the following source code statement:

ANSWER=PTR1+Y1

In this case, PTR1 has an address of 207,186 and the value contained within that address, "PTR1"=595,104. Y1 has an address of 432,844 and the variable ANSWER has an address of 725,132 as in the previous example.

Machine instructions would carry out the source code statement by requiring the following functions.

READ PTR1 AT 207,186 AND PLACE THE ANSWER IN REGISTER A.

READ THE CONTENTS OF THE ADDRESS SPECIFIED IN REGISTER A AND PLACE THE CONTENTS IN REGISTER A.

READ VARIABLE Y1 FROM 432,844 AND PLACE IN REGISTER B.

EXECUTE A+B AND PLACE THE RESULT IN REGISTER C.

PLACE 725,132 IN REGISTER A.

WRITE THE CONTENTS OF REGISTER C TO THE LOCATION SPECIFIED IN REGISTER A.

The problem that results from an indirect addressing is that the contents of the memory pointed to by PTR1 may specify an address serviced by any MCU. Until the contents of PTR1 are read, the MCU to be assigned to execute the transaction is not known.

In this case, to solve the problem, the instruction is replicated in all potentially relevant processing elements. Since Y1 is serviced by MCU 4, and MCU 4 is serviced by processing elements 2, 4, 9 and 11, instructions 1 and 2 must be replicated in all serviced PEs. However, instruction 2 will be valid only for MCU 5 and since only PE 2 services both MCU 5 and MCU 4, only PE 2 will have a valid instruction. In this case, a queue control write directive is included in the queue control field 430 which notifies the control unit to remove the instruction from the queue if the instruction is invalid.

Indirect addressing in the WRITE mode is handled similarly. The source code statement might be: WRITE ANSWER PTR1.

Like before, the destination for the writing is not known until the contents of PTR1 have been read and therefore it is unknown which MCU would service the WRITE. The variable answer is known to be located at 725,132 and is serviced by MCU 7.

Again the solution to the problem is to replicate the instruction in all possible processing elements. For MCU 7, this includes processing elements 3, 4, 8 and 12. Each of the instructions on an indirect write will be accompanied by a write directive in the queue control field which removes the queue entry if the instruction is invalid for that particular processing element.

Conditional jumps also require some special handling. Assume a source code statement: IF X1>Y1 GOTO ADDRESS1, ELSE GOTO ADDRESS2. Assuming the same address as before, the following sequence of instructions would be executed to carry out the source code statement.

READ Y1 AND MOVE INTO REGISTER A.

MOVE REGISTER A INTO REGISTER B.

READ X1 INTO REGISTER A.

SUBTRACT REGISTER B FROM REGISTER A.

IF FLAG=1 WRITE ADDRESS1 INTO THE PROGRAM COUNTER.

IF FLAG NE 1, WRITE ADDRESS2 INTO THE PROGRAM COUNTER.

It is common in processors to have a set of flags which indicate during mathematical operations that a result is negative. Such is the FLAG referred to above.

As can be seen from FIG. 7 each instruction memory is associated with a program counter 725. The program counter 725 specifies the particular instruction within instruction memory 720 should be executed.

If, the evaluation of the subtraction results in X1 being greater than Y1, the address of the program counter will be changed to address1. Otherwise it will be changed to address2. Since Y1 is found within the jurisdiction of MCU 4 and since X1 is found within the jurisdiction of MCU 5, by the example shown in FIG. 6, the processor which will execute this conditional jump is processing element PE 2.

However, in the example, there are twelve processors, eleven of which are unaware that a conditional jump has been executed.

To adhere to a common protocol for handling this situation, one can just introduce write directives (WDs) to all memory segments and perform "dummy" writings in all possible segments except a genuine one. For example, let us consider again the instruction where <PTR1,32.2> represent operands used to specify an indirect writing. This instructions takes an address in PTR1, say 324,562, and places in this address the content of the A register. As noted, this instruction will also be replicated in PE3, PE5, PE9, and PE10. The site where this instruction will be actually executed is PE9 for a pointed-to address within the memory space of MCU3. For all other registers in PE9, and also in PE3, PE5, and PE10 this instruction creates "dummy" information in the form of a duplication of the contents of the scratchpad registers. This duplication may be needed for some leftover READs and will be removed by appropriate WDs.

Our final concern is related to the organization of conditional JUMPs. A conditional JUMP is based on the analysis of the contents of a certain register, e.g. the sign of the number. Suppose that a conditional JUMP requires examining register #5. This examination will have been preceded by a WRITE-to-#5 operation. Thus, if we put the WRITE-to-#5 right before the conditional JUMP decision in PE5, and also in PE2, PE7, and PE12, then it will be properly handled in these PEs. To perform the conditional JUMPs in other PEs we have to move the contents of Register #5 to several additional registers and incorporate in their executional codes JUMP decisions based on these replicated contents of #5 register. Of course, all of these moves are associated with generation of appropriate WDs. Thus, to handle the conditional JUMP in the above example the following extra instructions may be generated:

MOVE-Cond#5, #2(* for PE1, PE8, PE11 *)

MOVE-Cond#5, #8(* for PE3, PE9, PE10 *)

MOVE-Cond#5, #4(* for PE4, PE9, PE11 *)

MOVE-Cond#5, #9(* for PE3, PE6, PE11 *)

If a finite projective plane implementation were used, the movement would be simpler.

These instructions have to be included in the PEs which can execute them. The conditional JUMPs checking registers #2, #8, #4, and #9 must be included in all PEs except those mentioned above which check register #5. Corresponding WDs must be included in all PEs.

It should be noted that there is a freedom in choosing the memory sections to spread the conditional JUMP information over the PEs. It is convenient to choose those segments where there are no more READs after the MOVE-Cond. Otherwise, the MOVE-Cond has to foresee the restoration of the previous contents of the register. With these provisions the problem of conditional JUMPs organization will be resolved with the regular mechanism of the PEs interactions.

Accordingly, there has been described a multiprocessing system which can run compiled code developed for single processor applications without change on a multiprocessing architecture of the invention. In doing so, the principal problems of the prior art multiprocessing systems have been overcome.

In this disclosure, there is shown and described only the preferred embodiment of the invention, but, as aforementioned, it is to be understood that the invention is capable of use in various other combinations and environments and is capable of change or modifications within the scope of the inventive concept as expressed herein.

We claim:

1. A computer system for concurrent execution of a serial program comprising:
   a. a memory, partitioned into memory blocks;
   b. a plurality of memory control units, each memory control unit controlling access to a respective memory block;
   c. a plurality of processing elements;
   d. an interconnection network of combinatorial design connecting each processing element to two or more memory control units; and
   e. means for allocating instructions of the serial program to a processing element of the plurality of processing elements based on the addresses of the operands specified within instructions.

2. The computer system of claim 1, further comprising:
   a. a plurality of secondary storage areas, one corresponding to each memory block, controlled by the same memory control unit as the corresponding memory block.

3. The computer system of claim 1 in which each memory control unit comprises:
   a. a scratch pad register and
   b. a unit controller.

4. The computer system of claim 3 in which the scratch pad register mirrors the registers of one of the processors served by the memory control unit.

5. The computer system of claim 3 in which the memory control unit includes a cache memory.

6. The computer system of claim 3 in which each memory control unit includes one scratch pad register for each processor which accesses the memory block served by the memory control unit.

7. The computer system of claim 1 in which the means for connecting each processing element to two or more memory control units includes one or more queues for receiving information from respective ones of the memory control units connected to the processor.

8. The computer system of claim 1 in which each processor includes an instruction memory, a private memory and means for processing global control information and signals.

9. The computer system of claim 1 in which each processor is a RISC or a CISC processor.

10. The computer system of claim 1 in which the instructions include an operation code, optional first and second addresses and a queue control indication.

11. A method of allocating instructions of a program to a plurality of processors of a computer system, said system having a partitioned memory space with each partition being controlled by a memory control unit and each processor connected to two or more memory control units using a network of combinatorial design for concurrent execution of a serial program comprising:
    a. allocating instructions of said serial program to a processor based on one or more partitions of the memory space in which the addresses of the operands specified within the instruction are located.

12. A method of accessing information in a computer system having a memory space partitioned into memory sections and a plurality of processing elements serving some but less than all memory sections comprising:
    a. controlling separately the access to each memory section with a memory control unit;
    b. transferring information from a plurality of processing elements to some but less than all memory control units using a network of combinatorial design; and
    c. allocating an instruction to a processing element serviced by memory control units which access memory sections containing the data elements required by said instruction.

* * * * *